(12) United States Patent
Stewart et al.

(10) Patent No.: US 9,129,495 B1
(45) Date of Patent: Sep. 8, 2015

(54) MULTI-PURPOSE SIDE CAMERA

(71) Applicant: AISIN TECHNICAL CENTER OF AMERICA, INC., Northville, MI (US)

(72) Inventors: Patrick Stewart, Taylor, MI (US); Eric Archambeau, South Lyon, MI (US); Katsuhiko Takeuchi, Canton, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 0 days.

(21) Appl. No.: 14/294,986

(22) Filed: Jun. 3, 2014

(51) Int. Cl.
*G03B 17/00* (2006.01)
*G08B 13/196* (2006.01)

(52) U.S. Cl.
CPC .................................. *G08B 13/1963* (2013.01)

(58) Field of Classification Search
CPC .................................................. G08B 13/1963
USPC ............................................................. 396/427
See application file for complete search history.

(56) References Cited

U.S. PATENT DOCUMENTS

| | | | |
|---|---|---|---|
| 5,995,758 A * | 11/1999 | Tyler | 396/13 |
| 7,355,629 B2 | 4/2008 | Lang et al. | |
| 7,891,886 B2 | 2/2011 | Schuetz | |
| 7,905,463 B2 * | 3/2011 | Burnham et al. | 248/550 |
| 8,167,506 B2 * | 5/2012 | Martos | 396/427 |
| 8,360,662 B1 * | 1/2013 | Harvey | 396/427 |

* cited by examiner

*Primary Examiner* — Clayton E Laballe
*Assistant Examiner* — Dennis Hancock
(74) *Attorney, Agent, or Firm* — Oblon, McClelland, Maier & Neustadt, L.L.P.

(57) ABSTRACT

A side camera of a vehicle, including a camera housing rotatable in a first axis and a second axis each relative to an exterior surface of the vehicle, and a camera attached to the camera housing that captures image data. The camera is positioned in a plurality of positions by rotating the camera housing along the first axis and the second axis.

5 Claims, 12 Drawing Sheets

Purpose: Parking Assist.

Purpose:
1. Replaces Side Mirror.
2. Reduces Blind Spot.

MULTI-PURPOSE SIDE CAMERA

BACKGROUND OF THE INVENTION

Field of the Invention

Exemplary aspects of the present invention relate to a camera mounted on a side of a vehicle that can be rotated along multiple axes for a variety of purposes. A conventional vehicle camera can be found, for example, in U.S. Pat. No. 7,355,629.

SUMMARY OF THE INVENTION

The present application relates to camera positioned on a side of a vehicle. The camera captures image data of the surrounding area of the vehicle. The location and articulation of the camera enable the camera to view various portions of the surroundings based on the desired function. Further, the camera can be activated in conjunction with other vehicle systems including an alarm system or a crash detection system. Moreover, the live or stored image data from the camera can be transmitted to a user.

A side camera of a vehicle, including a camera housing rotatable in a first axis and a second axis each relative to an exterior surface of the vehicle, and a camera attached to the camera housing that captures image data. The camera is positioned in a plurality of positions by rotating the camera housing along the first axis and the second axis.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION OF THE PREFERRED EMBODIMENTS

Referring now to the drawings, wherein like reference numerals designate identical or corresponding parts throughout the several views. Further, as used herein, the words "a," "an" and the like generally carry a meaning of "one or more," unless stated otherwise.

FIGS. 1-6 depict various aspects of a multi-purpose side camera of a vehicle. Here a vehicle refers to a land vehicle exemplified by an automobile. However, the present disclosure is also applicable to any similar type vehicle, such as but not limited to, a sport utility vehicle, a pickup truck, a commercial vehicle, aircraft, boat, or the like.

Figure 1:
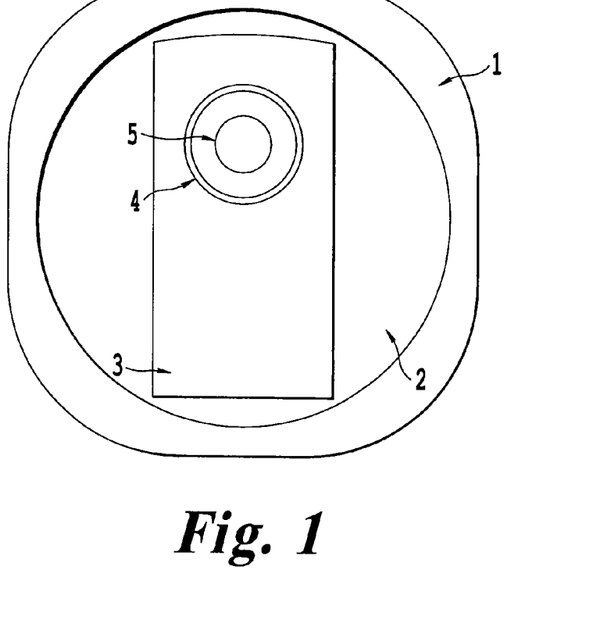
FIG. 1 illustrates a front view of a camera assembly in accordance with the present disclosure.

FIG. 1 displays a front view of a camera assembly. The assembly includes an external housing 1, a rotation disk 2, a camera housing 3, a shutter 4, and camera 5.

In particular, the external housing is attached to or part of a vehicle exterior. The particular geometry of the external housing 1 being dependent on the vehicle shape. The rotation disk 2 rotates relative to the external housing 1. The axis of rotation being orthogonal to the view perspective of FIG. 1. Shown in FIG. 2, the rotation disk 2 includes a plurality of teeth 12 around an outer periphery of the rotation disk 2.

The camera housing 3 is attached to the rotation disk 2. Shown in FIGS. 1 and 2, the camera housing 3 is attached to an outer surface of the rotation disk 2 but other means of attachment are possible. As the camera housing 3 is integral with the rotation disk 2, and the camera housing 3 rotates relative to the external housing 1 via the rotation of the rotation disk 3.

A shutter 4 is attached to or integrated into the camera housing 3. In particular, the cameral housing 3 has a circular hole and the shutter 4 is fixed behind the circular hole by a holder. The camera 5 is located behind the shutter 4 and is also fixed by the holder. The camera 5 is arranged so that the camera 5 is able to view through the shutter 4. That is, the shutter 4 includes an aperture that is fixed or that selectively allows light outside the camera assembly to reach the camera 5.

The camera 5 is attached to, for example, an electronic control unit of the vehicle. The electronic control unit being able to process image data received by the camera 5 and able to control usage of the camera 5.

Figure 2:
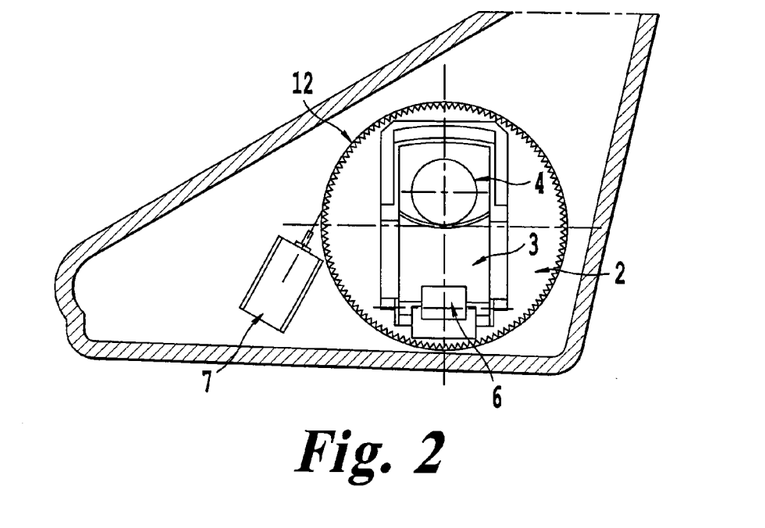
FIG. 2 illustrates a rear view of a camera assembly in accordance with the present disclosure.

Shown in FIG. 2, the camera assembly is also provided with several electric motors. These motors can also be connected to the electronic control unit in order to control the operation of the motors. A first motor 6 is provided to the camera housing 3. The first motor 6 allows the camera housing 3 to pivot around a rotation point 9 illustrated in FIGS. 3 and 4. The rotation point 9 can be, for example, a rod attached to the camera housing 3 that fits into channels provided to the rotation disk 2.

The first motor 6 is connected to the camera housing 3 by a worm gear 8. Via the worm gear 8, the first motor 6 can rotate the camera housing 3 and the integrally mounted shutter 4 and camera 5 around the rotation point 9. Therefore, the camera housing 3 is able to rotate inward and outward relative to the external housing 1.

Figure 3:
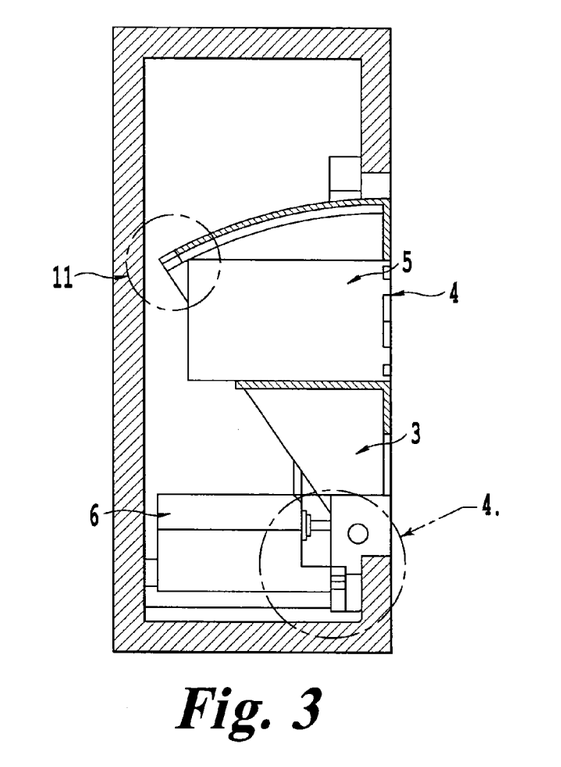
FIG. 3 illustrates a section view of a camera assembly in accordance with the present disclosure.
Figure 4:
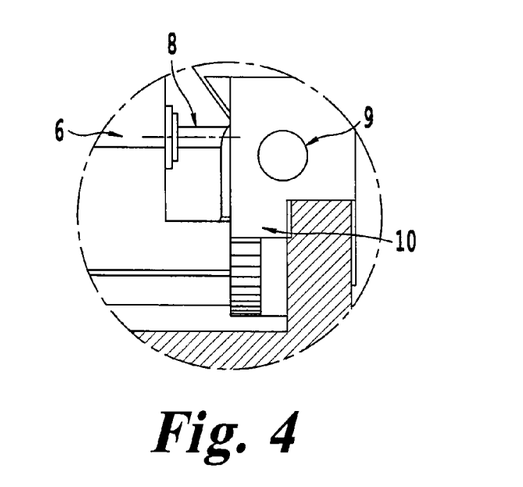
FIG. 4 illustrates a detailed view of a portion of the section view of FIG. 3 of a camera assembly in accordance with the present disclosure.
Figure 5:
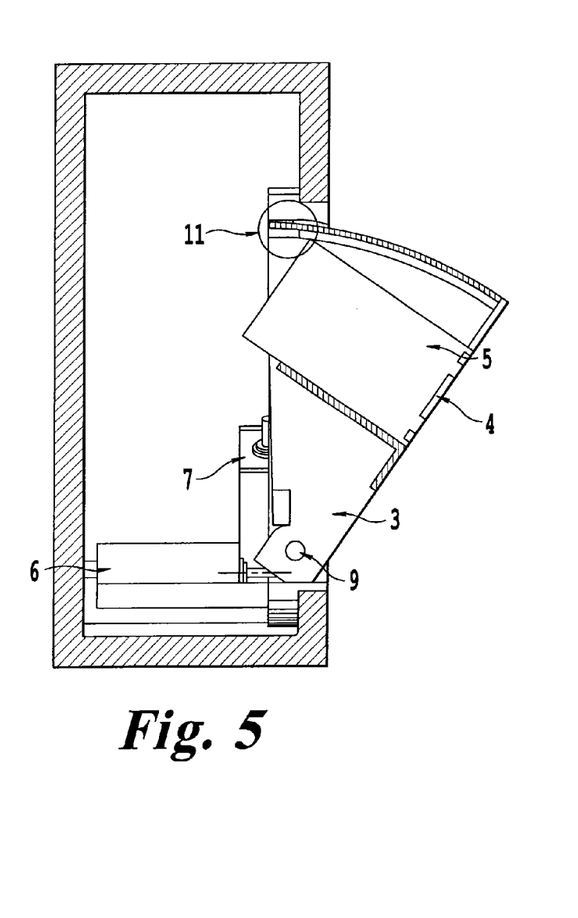
FIG. 5 illustrates a section view of a camera assembly in accordance with the present disclosure.

The camera housing 3, as illustrated in FIGS. 3 and 5, has a roughly pie-shaped (rounded wedge) cross section. An end of the camera housing 3 adjacent to the rotation point 9 includes a stopper 10. FIG. 4 illustrates an enlarged view of a portion of FIG. 3. The stopper 10, shown in FIG. 4, abuts a portion of the external housing 1. When the stopper 10 contacts the external housing 1, the housing 3 is unable to rotate inward (left in FIG. 3) any farther. The stopper 10 defines a maximum inward rotation and defines a closed position which corresponds to an angle relative to the vehicle body.

An opposite side of the camera housing 3 includes a stopper 11. When the stopper 11 contacts the external housing 1, the housing 3 is unable to rotate outward (right in FIG. 5) any farther by the first motor 6. The stopper 11 defines a maximum outward rotation and defines a fully open position which corresponds to a predetermined angle. FIG. 5 illustrates the predetermined angle relative to the vehicle.

A second motor 7 is provided to assembly. The second motor 7 includes a worm gear that meshes with the teeth 12 of the rotation disk 2. Accordingly, rotation of the second motor 7 causes the rotation disk 2 to rotate. The second motor 7 can be arranged to be bi-directional therefore causing rotation of the rotation disk 2 in a clockwise and counter-clockwise direction. By the integral arrangement of the camera housing 3 with the rotation disk 2, the second motor 7 can rotate the camera 5. The rotation disk 2 can be configured to rotate relative to the vehicle body.

FIG. 5 illustrates the camera assembly in the fully open position, as described above. That is, the housing 3 is restrained from further outward rotation, via the first motor 6, by the stopper 11. FIG. 5 also illustrates that the camera housing 3 is oriented in a vertical direction. That is, the second motor 7 has oriented the rotation disk 2 so that the camera housing 3 is oriented vertically with respect to the vehicle body.

Figure 6:
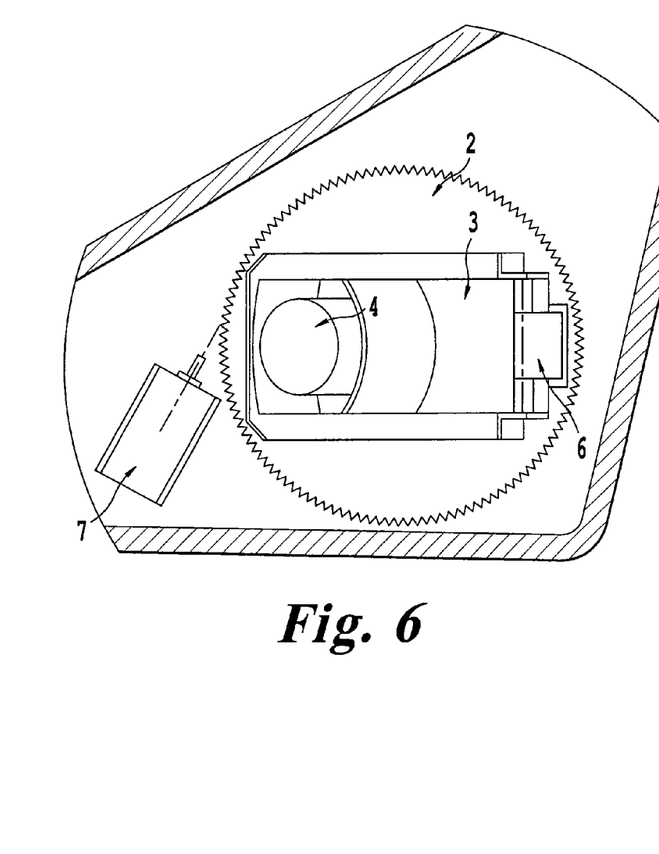
FIG. 6 illustrates a rear view of a camera assembly in accordance with the present disclosure.

FIG. 6 also illustrates the camera assembly in the fully open position, as shown in FIG. 5. FIG. 6 illustrates that the camera house 3 is oriented in a horizontal direction which is at an angle relative to the vertical position of FIG. 5. To effect this orientation, the second motor 7 rotates the rotation disk 2 from the vertical position.

Described above, the camera 5 via the attachment to the camera housing 3 and the rotation disk 2, is able to rotate around two axes by actuation of the first motor 6 and the second motor 7. When mounted on a vehicle, the camera can be rotated on multiple axes to transition between multiple positions. These positions include a position in which a face of the camera 5 is flush with the vehicle's exterior styling and monitor video images of the areas to the side of the vehicle; a position in which the camera assembly is rotated on a single axis to monitor video images of the ground clearance surrounding the vehicle; and a position in which the camera assembly is rotated on an additional axes to monitor video images of the areas to the rear and sides of the vehicle. Therefore, the camera can be articulated to a variety of positions for a wide range of uses.

Some of these uses will now be described. In FIG. 7-18 the ranges X and Y are depicted to illustrate the range of a view of the camera 5 along these respective axes. These ranges are impacted by the motors 6 and 7, the camera 5, and the shutter 4.

Figure 7:
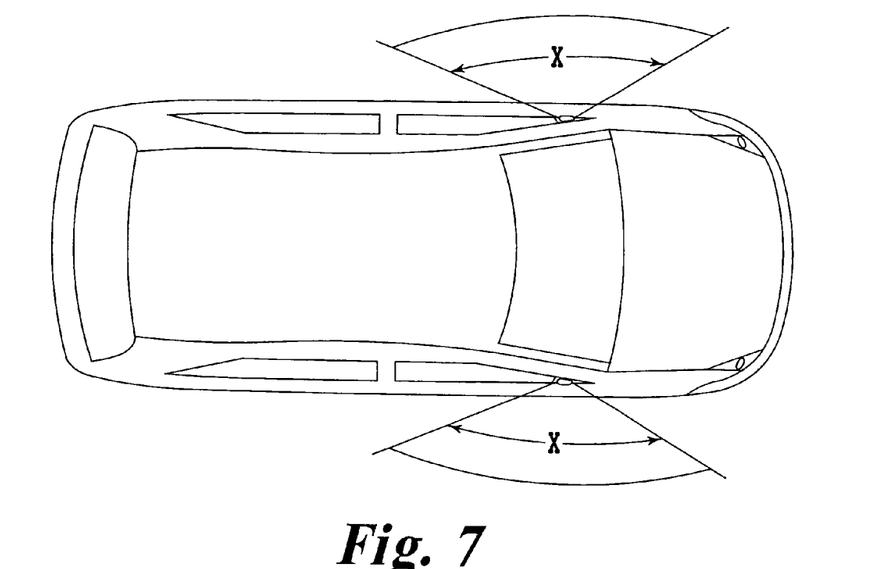
FIG. 7 illustrates a field of vision of a camera assembly in accordance with the present disclosure in a first position from the top.
Figure 8:
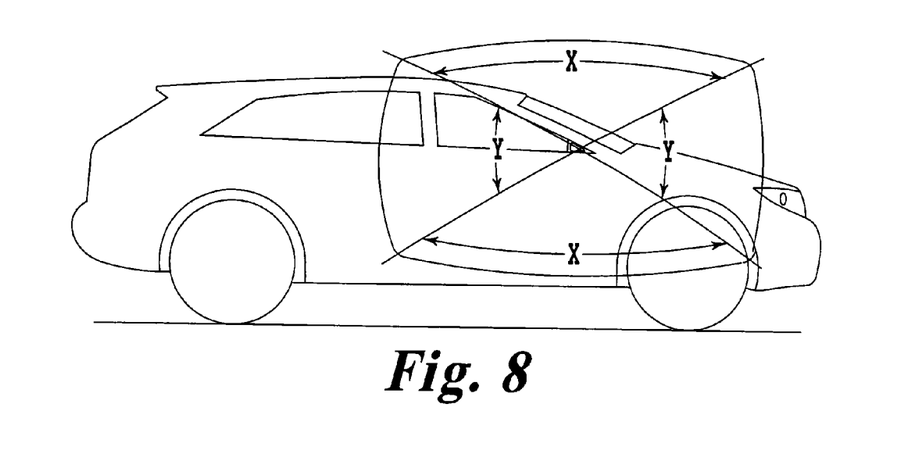
FIG. 8 illustrates a field of vision of a camera assembly in accordance with the present disclosure in the first position from the side.
Figure 9:
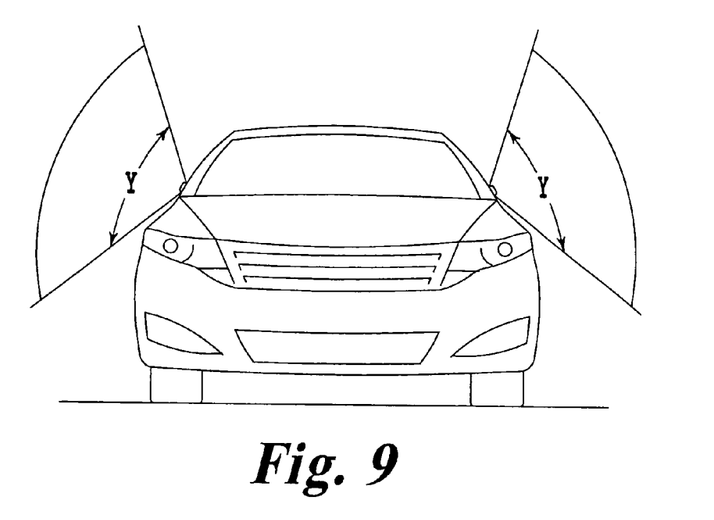
FIG. 9 illustrates a field of vision of a camera assembly in accordance with the present disclosure in the first position from the front.

FIGS. 7-9 illustrate a field of vision of the camera 5 from the top, side, and front views of the assembly in a first position. This first position corresponds to the orientation of the assembly shown in FIGS. 2 and 3. In the first position, an outer face of the assembly is oriented by the first motor 6 to allow for a flush appearance with the vehicle's exterior styling surrounding the assembly.

The main function of the assembly in the first position is to detect and acknowledge the approach of a driver through integration with smart key or other passive entry systems. Additionally, the camera 5 is programmed to activate and record video images in the event that an alarm of the vehicle activates or an impact is detected by the vehicle. When neither of these conditions are met, the camera 5 is deactivated by the ECU and powers down. Further, the shutter 4 closes.

Figure 16:
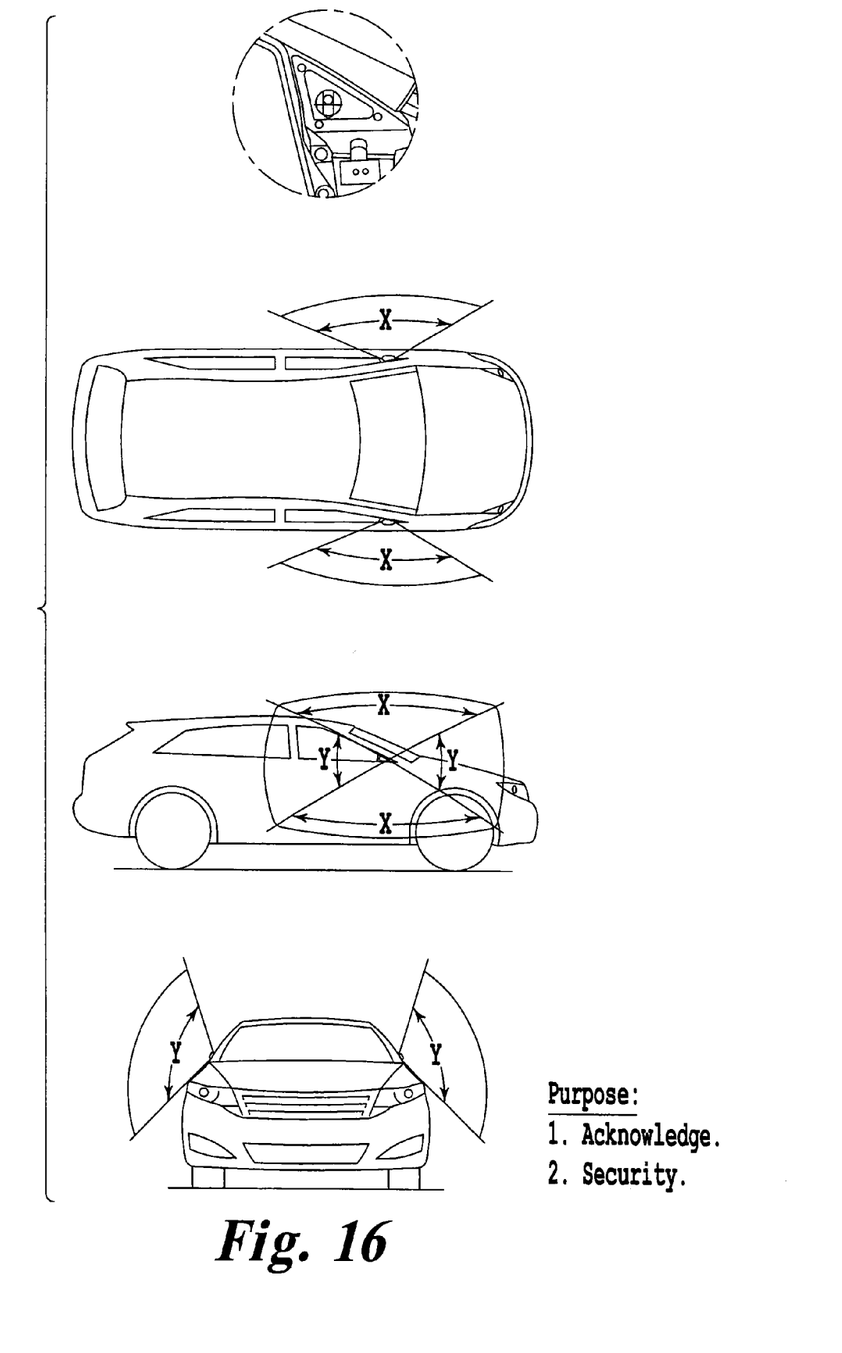
FIG. 16 illustrates a field of vision of a camera assembly in accordance with the present disclosure in the first position.

FIG. 16 combines the views of the first (flush) position, which are represented individually by FIGS. 7-9, in order to provide an overall image of the first position and its related functions.

Figure 10:
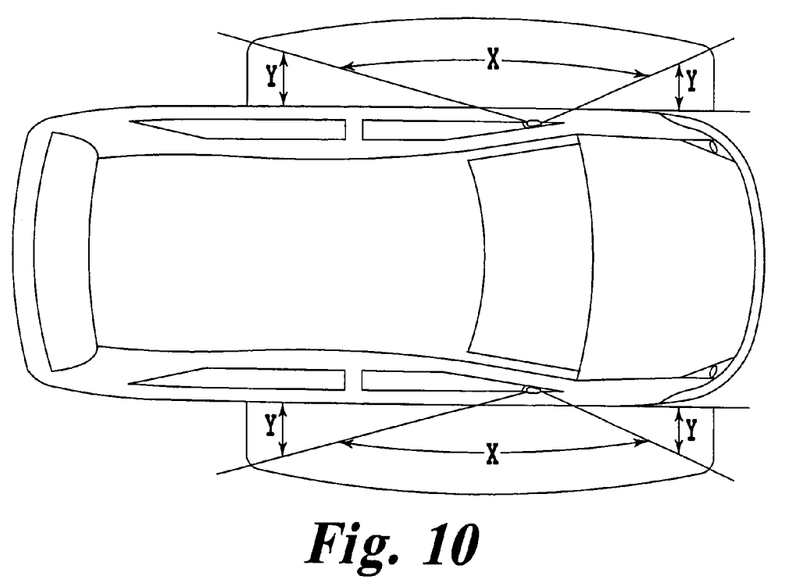
FIG. 10 illustrates a field of vision of a camera assembly in accordance with the present disclosure in a second position from the top.
Figure 11:
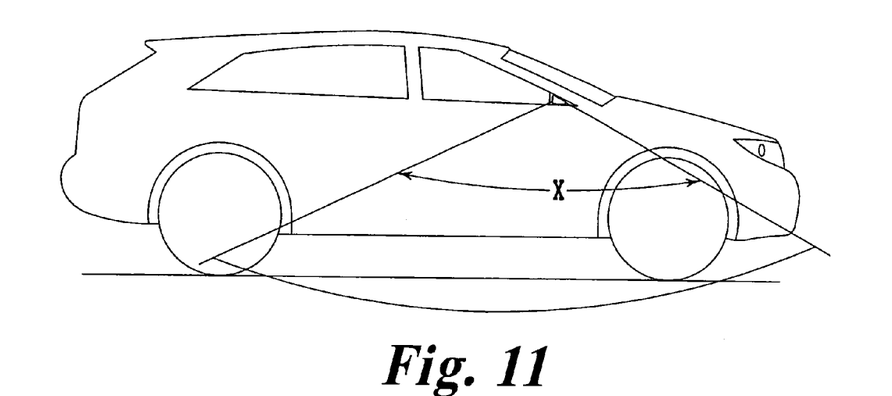
FIG. 11 illustrates a field of vision of a camera assembly in accordance with the present disclosure in the second position from the side.
Figure 12:
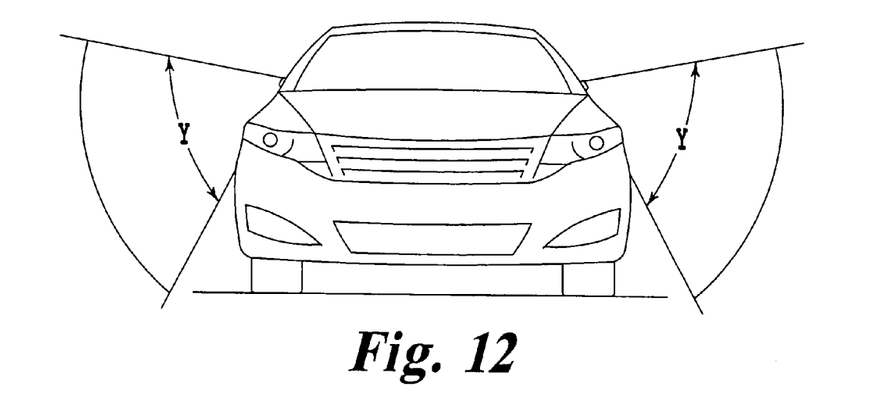
FIG. 12 illustrates a field of vision of a camera assembly in accordance with the present disclosure in the second position from the front.

FIGS. 10-12 illustrate a field of vision of the camera 5 from the top, side, and front views of the assembly in a second position. To move to the second position from the first position, the first motor 6 drives the worm gear 8 mounted on the camera housing 3. Therefore, the camera housing 3 rotates around a horizontal axis, at the rotation point 9, parallel to the side of the vehicle. The configuration illustrated in FIG. 5 corresponds to the second position.

The main function of the assembly in the second position is to provide video images of the area of the ground along the side of the vehicle. This allows the operator to determine the vehicle's clearance when parking or moving at low speeds. The assembly can be configured not to move to the second position if the vehicle has been traveling at a relatively high speed within a predetermined amount of time. This function allows the assembly to account for traffic conditions, but is overridden if the vehicle is put into reverse.

Figure 17:
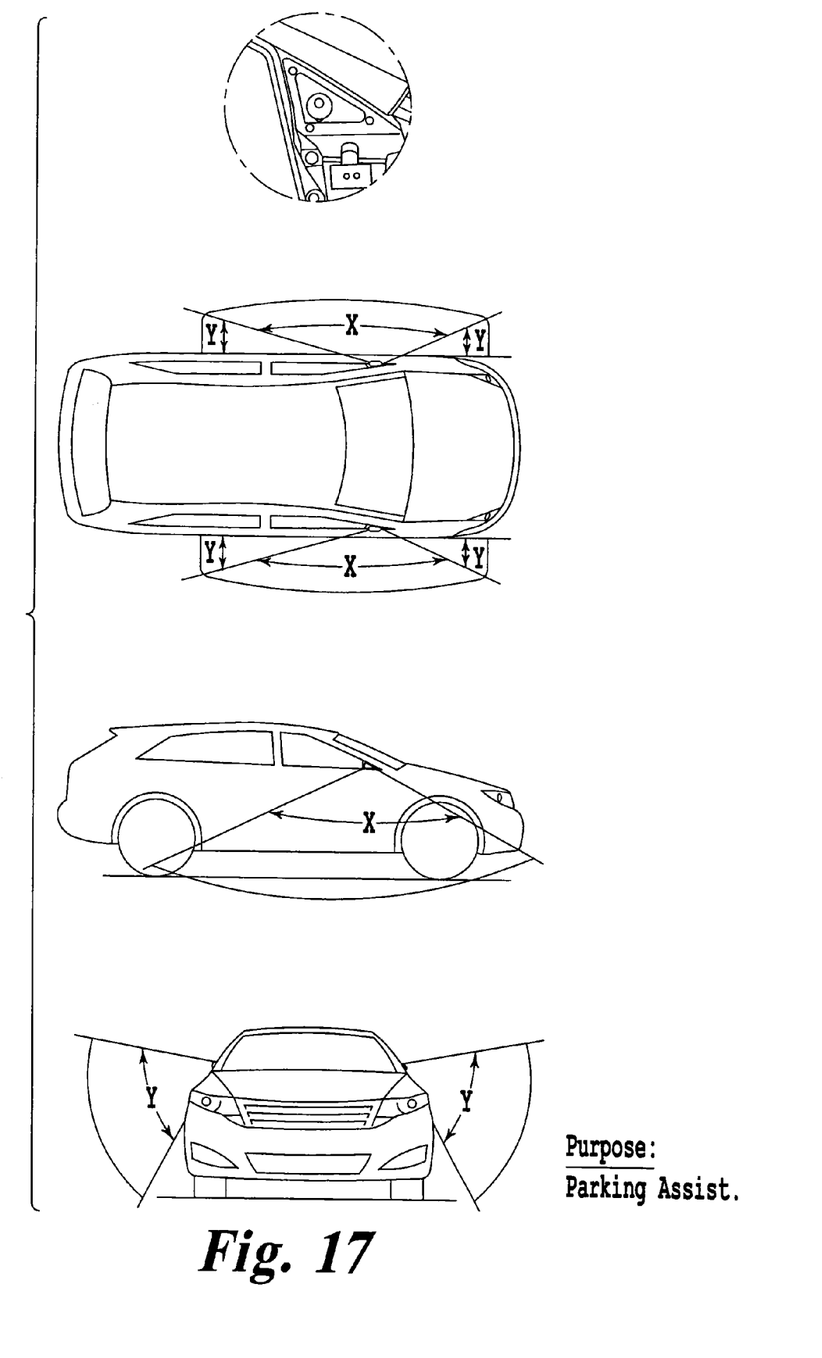
FIG. 17 illustrates a field of vision of a camera assembly in accordance with the present disclosure in the second position.

Shown in FIG. 17, the second position, or clearance position, looks primarily downward toward the curb or street. Described above, this position can be used as a parking assist to the driver.

Figure 13:
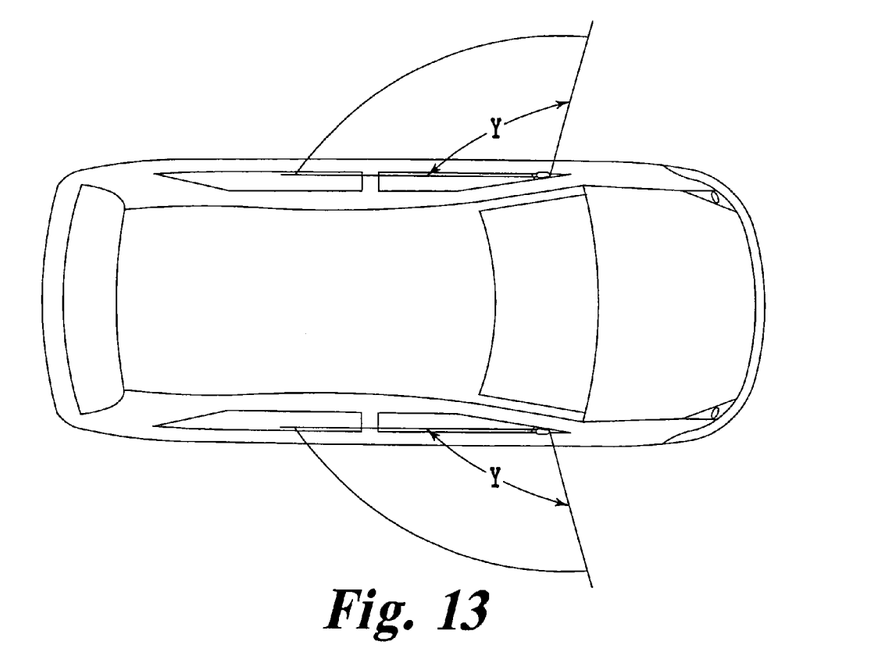
FIG. 13 illustrates a field of vision of a camera assembly in accordance with the present disclosure in a third position from the top.
Figure 14:
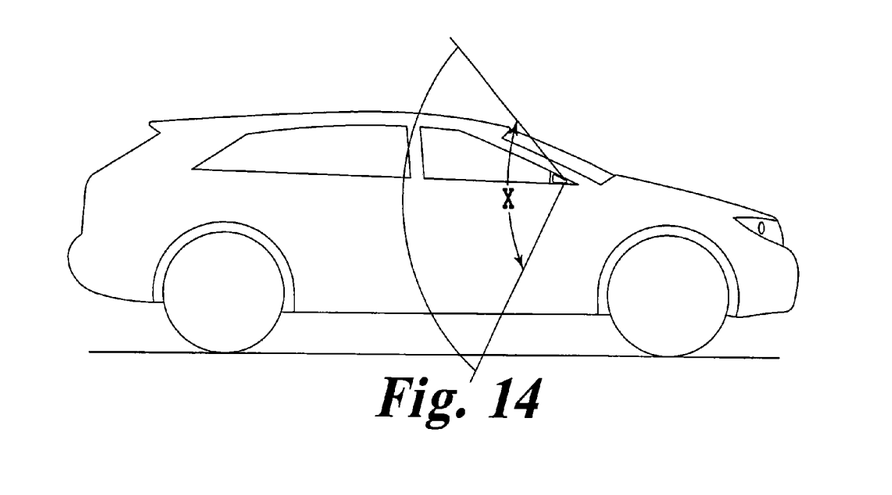
FIG. 14 illustrates a field of vision of a camera assembly in accordance with the present disclosure in the third position from the side.
Figure 15:
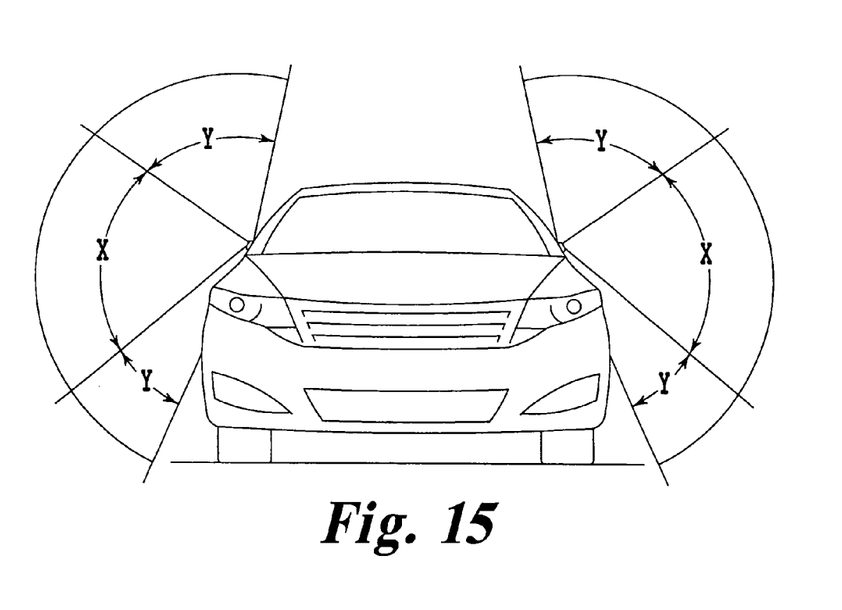
FIG. 15 illustrates a field of vision of a camera assembly in accordance with the present disclosure in the third position from the front.

FIGS. 13-15 illustrate a field of vision of the camera 5 from the top, side, and front views of the assembly in a third position. To move to the third position from the second position, the second motor 7 drives the teeth 12 of the rotation disk 2 and rotates the rotation disk 2 until the camera housing 3 is at a horizontal orientation. The position of the housing 3 as set by the first motor 6 is unchanged when moving from the second position to the third position. FIG. 6 illustrates the assembly in the third position.

The main function of the assembly in the third position is to provide video images of the area within a minimum of distance to the sides and rear of the vehicle. This function allows for the assembly to replace the exterior side mirrors of the vehicle, and improve both aerodynamics and exterior styling.

Figure 18:
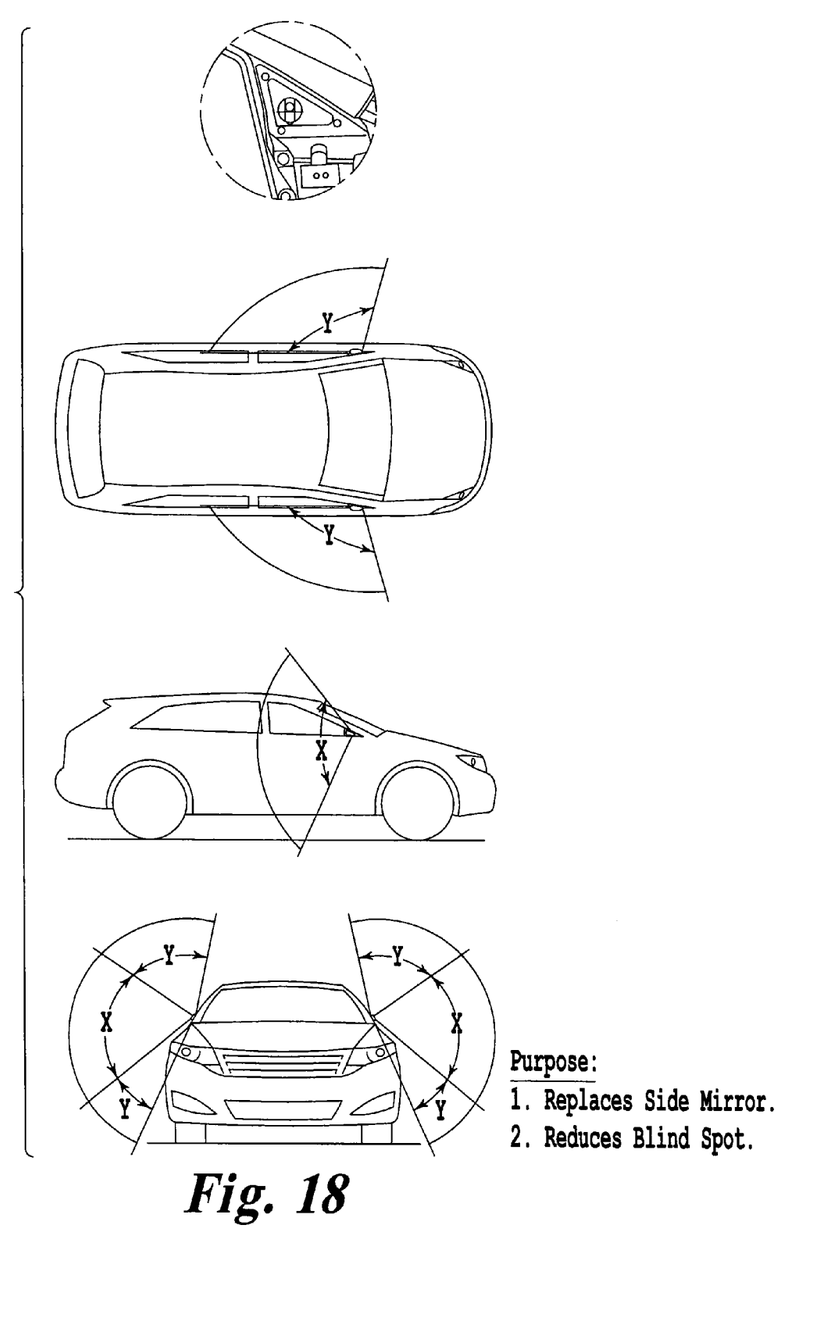
FIG. 18 illustrates a field of vision of a camera assembly in accordance with the present disclosure in the third position.

Shown in FIG. 18, the third position, or blind spot position, looks primarily rearward operating similar to traditional side mirrors. Accordingly, the assembly in the third position can function as the side mirrors and has the additional function of reducing a blind spot of these mirrors.

Discussed above and illustrated in FIGS. 7-18, the structure of the camera assembly can be articulated and configured to serve a variety of purposes including, but not limited to, vehicle security, parking assistance, and blind spot monitoring.

Figure 19:
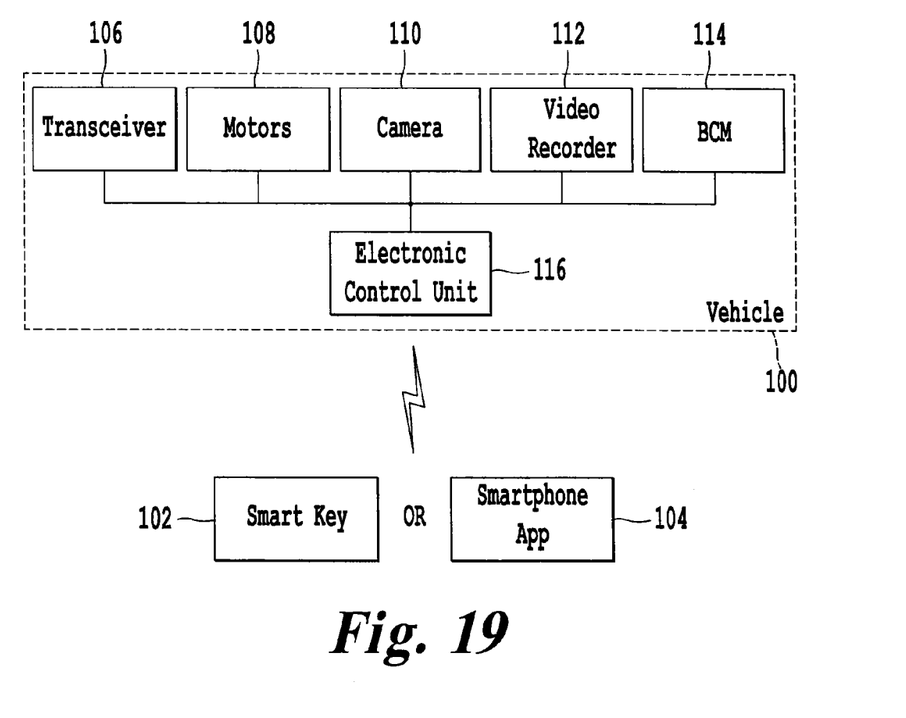
FIG. 19 illustrates a control diagram of a camera assembly in accordance with the present disclosure.

FIG. 19 is a structural diagram of an electronic system in accordance with the present application. Here, a vehicle 100 includes an electronic control unit (ECU) 116. The ECU 116 interacts with a camera 110 (corresponding to camera 5); motors 108 (corresponding to first motor 6 and second motor 7) a transceiver 106; a video recorder 112; and a body control module (BCM) 114. The ECU 116 controls various aspects of the camera assembly. The transceiver 106 interacts wirelessly with a smart key/passive keyless entry system 102 and/or a smartphone operating an app 104. The video recorder 112, records image data provided by the camera 110. The BCM 114 controls and interacts with vehicle body functions such as a door unlocking feature. Using the control structure described above and illustrated in FIG. 19, the camera assembly can be operated in at least the three positions described above with the respective functions at these positions.

Described above, the camera assembly of the present disclosure has several advantages. By having the camera rotate about multiple axes, the camera assembly allows for virtually complete coverage of the area directly to the side of a vehicle. By doing so, the camera reduces the size of the driver's blind spot and improves safety. Because the camera can be rotated to display the areas of the sides to the rear, the camera assembly can be used to replace the traditional exterior side mirrors of motor vehicles, which improves the vehicle's styling and aerodynamics. Further, the camera assembly can be integrated with other technologies, such as a 360° camera system or facial recognition technology, to further improve the camera's overall functionality and capabilities.

Obviously, numerous modifications and variations of the present invention are possible in light of the above teachings. It is therefore to be understood that within the scope of the appended claims, the invention may be practiced otherwise than as specifically described herein.

The invention claimed is:

1. A side camera of a vehicle, comprising:
    a camera housing rotatable in a first axis and a second axis each relative to an exterior surface of the vehicle;
    a camera attached to the camera housing that captures image data; and
    a first motor that rotates the camera housing around the first axis, rotating the camera housing inward and outward relative to the exterior of the vehicle,
    wherein the camera has a range of motion along the first axis which includes a closed position in which a front face of the camera housing is flush with an exterior surface of the vehicle.

2. The side camera according to claim 1, further comprising:
    a rotation disk attached to a rear side of the camera housing, the rotation disk being rotatable in the second axis; and
    a second motor that rotates the camera housing around the second axis by rotating the rotation disk.

3. The side camera according to claim 2, further comprising:
    a first stopper that prevents the camera housing from rotating inward to define the closed position; and
    a second stopper that prevents the camera housing from rotating further outward to define an open position in which the front face of the camera housing is extended beyond the exterior surface of the vehicle.

4. The side camera according to claim 2, wherein a peripheral edge of the rotation disk includes teeth that mesh with a gear of the second motor.

5. The side camera according to claim 2, wherein the rear side of the camera housing is opposite to a side of the camera housing in which the camera is attached.

* * * * *